US007142253B2

(12) United States Patent
Weitbruch et al.

(10) Patent No.: US 7,142,253 B2
(45) Date of Patent: Nov. 28, 2006

(54) METHOD AND APPARATUS FOR PROCESSING VIDEO PICTURES FOR IMPROVING PICTURE QUALITY FOR SUBSEQUENT DISPLAY

(75) Inventors: Sebastien Weitbruch, Mönchweiler (DE); Carlos Correa, Villingen-Schwenningen (DE); Rainer Zwing, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 588 days.

(21) Appl. No.: 10/432,146

(22) PCT Filed: Nov. 9, 2001

(86) PCT No.: PCT/EP01/12971

§ 371 (c)(1), (2), (4) Date: May 16, 2003

(87) PCT Pub. No.: WO02/41291

PCT Pub. Date: May 23, 2002

(65) Prior Publication Data

US 2004/0041949 A1 Mar. 4, 2004

(30) Foreign Application Priority Data

Nov. 18, 2000 (EP) ................................. 00250390

(51) Int. Cl.
*H04N 5/21* (2006.01)

(52) U.S. Cl. ...................................... 348/616; 348/607

(58) Field of Classification Search ................ 348/616, 348/607, 617, 620, 621, 624, 699–701, 797, 348/771; 375/240.16, 240.25, 240.26, 240.28; 345/611, 672, 690, 691; *H04N 5/21, 5/213*
See application file for complete search history.

(56) References Cited

U.S. PATENT DOCUMENTS 6,476,875 B1 * 11/2002 Correa et al. .............. 348/607
6,961,379 B1 * 11/2005 Weitbruch et al. ..... 375/240.16

FOREIGN PATENT DOCUMENTS

EP 978 817 A1 2/2000
EP 980 059 A1 2/2000

OTHER PUBLICATIONS

Showbhik Kalra and Man-Nang Chong, *Bidirectional Motion Estimation via Vector Propagation*, IEEE Transactions on Circuits and Systems for Video Technology, vol. 8, No. 8, Dec. 1998.
Search Report *.

* cited by examiner

*Primary Examiner*—Sherrie Hsia
(74) *Attorney, Agent, or Firm*—Joseph J. Laks; Robert B. Levy

(57) ABSTRACT

The invention relates to a method for processing data of video pictures for displaying the pictures on a display device like a Plasma Display Panel. The existing false contour effect compensation methods which make a false contour compensation based on shifting sub-field code word entries along the direction of the motion vector of a current pixel, produce an artifact in the pictures, in case of object crossings. In the appearing area there is a lack of light generation.

The invention solves this problem by checking whether an area exists in the picture which is currently hidden but will appear in a next frame and providing an adapted compensation method for "hole filling". The invention also gives a solution for an improved compensation method which is based on a dragging of sub-field code word entries along a motion vector direction to a current pixel.

10 Claims, 6 Drawing Sheets

METHOD AND APPARATUS FOR PROCESSING VIDEO PICTURES FOR IMPROVING PICTURE QUALITY FOR SUBSEQUENT DISPLAY

This application claims the benefit under 35 U.S.C. § 365 of International Application PCT/EP01/12971 filed Nov. 9, 2001, which claims the benefit of European Application No. 00250390.2, filed Nov. 18, 2000.

FIELD OF THE INVENTION

The invention relates to a method and apparatus for processing video pictures especially for false contour effects compensation. More general, the invention is closely related to a kind of video processing for improving the picture quality of pictures which are displayed on matrix displays like plasma display panels (PDP) or display devices with digital micro mirror arrays (DMD).

BACKGROUND

Although plasma display panels are known for many years, plasma displays are encountering a growing interest from TV manufacturers. Indeed, this technology now makes it possible to achieve flat colour panels of large size and with limited depths without any viewing angle constraints. The size of the displays may be much larger than the classical CRT picture tubes would have ever been allowed.

Referring to the latest generation of European TV sets, a lot of work has been made to improve its picture quality. Consequently, there is a strong demand, that a TV set built in a new technology like the plasma display technology has to provide a picture so good or better than the old standard TV technology. On one hand, the plasma display technology gives the possibility of nearly unlimited screen size, also of attractive thickness, but on the other hand, it generates new kinds of artefacts which could reduce the picture quality. Most of these artefacts are different from the known artefacts occurring on classical CRT color picture tubes. Already due to this different appearance of the artefacts makes them more visible to the viewer since the viewer is used to see the well-known old TV artefacts.

In the plasma display technology field a specific new artefact is known, which is called “dynamic false contour effect” since it corresponds to disturbances of gray levels and colors in the form of an apparition of colored edges in the picture when an observation point on the matrix screen moves. This kind of artefact is enhanced when the image has a smooth gradation like when the skin of a person is being displayed (e. g. displaying of a face or an arm, etc.). In addition, the same problem occurs on static images when observers are shaking their heads and that leads to the conclusion that such a failure depends on the human visual perception and happens on the retina of the eye.

Two approaches have been discussed to compensate for the false contour effect. As the false contour effect is directly related to the sub-field organization of the used plasma technology one approach is to make an optimization of the sub-field organization of the plasma display panels. The sub-field organization will be explained in greater detail below but for the moment it should be noted that it is a kind of decomposition of the 8-bit gray level in 8 or more lighting sub-periods. An optimization of such a picture encoding will have, indeed, a positive effect on the false contour effect. Nevertheless, such a solution can only slightly reduce the false contour effect amplitude but in any cases the effect will still occur and will be perceivable. Furthermore, sub-field organization is not a simple matter of design choice. The more sub-fields are allowed the more complicated will the plasma display panel be. So, optimization of the sub-field organization is only possible in a narrow range and will not eliminate this effect alone.

The second approach for the solution of above-mentioned problem is known under the expression “pulse equalization technique”. This technique is a more complex one. It utilizes equalizing pulses which are added or separated from the TV signal when disturbances of gray scales are foreseen. In addition, since the fact that the false contour effect is motion relevant, we need different pulses for each possible speed. That leads to the need of a big memory storing a number of big look-up tables (LUT) for each speed and there is a need of a motion estimator. Furthermore, since the false contour effect depends on the sub-field organization, the pulses have to be re-calculated for each new sub-field organization. However, the bid disadvantage of this technique results from the fact that the equalizing pulses add failures to the picture to compensate for a failure appearing on the eye retina. Additionally, when the motion is increasing in the picture, there is a need to add more pulses to the picture and that leads to conflicts with the picture contents in case of very fast motion.

The invention deals with a specific new problem which is called “appearing area” since it corresponds to missing information for controlling pixels of a display by shifting time periods from one pixel to another pixel for compensating dynamic false contour effects.

In a first approach there has been disclosed a method for compensating the false contour effect using a motion estimator which determines motion vectors for the pixels. The resulting motion vectors are utilized for re-coding the pixels of the block wherein in the re-coding step a step of shifting the time periods of pixels is included. The time periods define the time during which the pixels are activated for sending out light. The time periods are hereinafter also called “sub-fields”. The so calculated data for activating the pixels are used to display the picture instead of displaying the original pixel data.

There are situations in which a block and a background are moving in different directions and therefore the shifting of the sub-field code word entries for the pixels of the moving front object and the moving background object in the two different directions generates a lack of light pulses for pixels of the appearing area.

As a conclusion the shifting of sub-fields as it is disclosed in the document EP 0 978 817 A1 generates in certain situations mistakes in the video pictures.

SUMMARY OF THE INVENTION

Therefore, it is an object of the present invention to disclose a method and an apparatus for processing video pictures which improves the picture quality without affecting the picture content and which is easy to implement.

According to the present principles, the improvement of the picture quality is achieved by checking whether there is an area in a video picture which is currently hidden but which appears in a next video picture. If such an area is detected, then the sub-field code words of pixels from the appearing area in the current picture are updated by utilizing sub-field code word entries of pixels from the appeared area in a next video picture. Therefore, the invention uses information from the next video picture in order to make an correction of the pixels in the previous video picture. With this method it is possible to improve the quality of the false contour compensation at the border of crossing objects. Further, the algorithm avoids “black holes” or double edges at those locations. In addition, it globally improves the quality of the picture by a respect of strong transitions combined with a false contour compensation of such edges: the sharpness of the picture is enhanced.

For the case that a picture improvement is made by shifting sub-field code word entries in the direction of a motion vector, it is advantageous to update the code words of the pixels from the appearing area in the current picture by taking over sub-field code word entries of corresponding pixels from the appeared area in a next video picture. This corresponds to a “hole filling” in the appearing area.

For the case that a picture improvement is made by dragging sub-field code word entries to a current pixel from pixels in the direction of a motion vector, it is advantageous to drag sub-field code word entries of corresponding pixels in a next video picture along the motion vector direction to a current pixel in the current video picture. This compensates for the artifact of edge doubling at the borders of object crossings.

For detecting an appearing area in a picture it is advantageous to analyse whether for pixels located on the mirror transformed motion vector arrow of the current pixel motion vectors are assigned, which do not have a similarity with the motion vector of the current pixel. This is very simple to implement and gives reliably the information for a pixel whether it belongs to an appearing area or not.

For an apparatus according to the invention it is advantageous that the apparatus comprises an appearing area detector in which it is checked in the current picture whether there is an area which is currently hidden but appears in a next video picture, and wherein the apparatus comprises a further processing unit in which the sub-field code words of pixels from the appearing area in the current picture are compensated by utilizing sub-field code word entries of pixels from the appeared area in a next video picture.

BRIEF DESCRIPTION OF THE DRAWINGS

Exemplary embodiments of the invention are illustrated in the drawings and are explained in more detail in the following description.

In the figures.

DETAILED DESCRIPTION

A plasma display panel utilizes a matrix array of discharge cells which could only be switched on or off. Unlike a CRT or LCD in which grey levels are expressed by analogue control of the light emission, in a PDP the grey level is controlled by modulating the number of light pulses per frame. This time modulation will be integrated by the eye over a period corresponding to the eye-time response. When an observation point (eye focus area) on the PDP screen moves, the eye will follow this movement. Consequently, it will no more integrate the light from the same cell of a frame period (static integration) but it will integrate information coming from different cells located on the movement trajectory. Thus, it will mix all the light pulses during this movement which leads to a faulty impression of the signal information. This effect will now be explained in more detail. In the field of digital video processing, all 8-bit (256) RGB-levels are represented by a combination of the 8 following bits:

$2^0=1,\ 2^1=2,\ 2^2=4,\ 2^3=8,\ 2^4=16,\ 2^5=32,\ 2^6=64,\ 2^7=128.$

Figure 1:
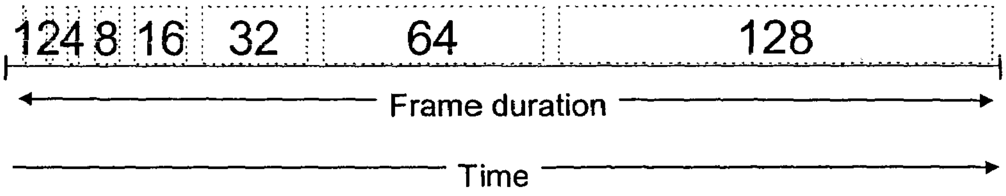
FIG. 1 shows an illustration for explaining the sub-field organization of a PDP.

To enable such a coding with the PDP technology, the frame period could be divided in 8 lighting periods (called sub-fields), each one corresponding to a bit. The number of light pulses for the bit “2” is the double as for the bit “1” . . . With these 8 sub-periods, it is possible through combination, to build the 256 gray levels. A possible sub-field organization with 8 sub-fields is shown in FIG. 1.

For clarification it is added, that a sub-field period is a sub-period of a frame period and consists of three phases, namely addressing period, sustaining period and erasing period. During the addressing period the cells which need to be activated according to a sub-field code word are written (precharged) with a defined voltage. It is a prerequisite that the charge stored in a cell remains stable for a certain time period. After all cells have been written, the cells are subjected to the sustaining phase, where additional charge is loaded into the cells in small pulses. This leads to an ignition of those cells, previously being written in the addressing phase. UV-radition is produced during ignition and in consequence, the phosphorous material of the cells is excited and light is output. It follows an erasing phase for all the cells to transform the cells back to a neutral state.

Without motion, the eye of the observers will integrate over about a frame period these small lighting pulses and catch the impression of the right gray level/colour level.

Figure 2:
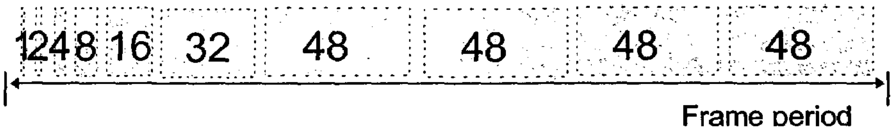
FIG. 2 shows a second example of a sub-field organization of a PDP.
Figure 3:
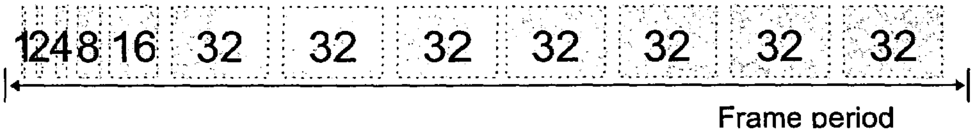
FIG. 3 shows a third example of a sub-field organization of a PDP.

In the field of plasma video encoding, the use of more than 8 sub-fields to represent the 256 original video levels is very common. This aims at reducing the level of the MSBs which are directly linked to the maximum level of false contour generated. A first example of such a sub-field organisation based on 10 sub-fields is shown in FIG. 2. A second example of a sub-field organisation based on 12 sub-fields is shown in FIG. 3. In the shown example there are seven time periods (sub-fields, only sustain phase shown for simplification) with the duration of 32 relative time units, one time period with the duration of 16 units, one time period with the duration of 8 units, one time period with the duration of 4 units, one time period with the duration of 2 units and one time period with the duration of 1 unit. The sum of the relative time units is 255. Of course, the sub-field organisations shown in FIGS. 2 and 3 are only examples and the sub-field organisation can be subject of modification for other embodiments.

The light generation in a PDP according to this sub-field organization still shows image quality degradation corresponding to disturbances of grey levels and colours in case of moving transitions. As already explained, these disturbances are defined as so-called dynamic false contour effect since the fact that it corresponds to the appearance of coloured edges in the picture when an observation point on the PDP screen moves. The observer has the impression of a strong contour appearing on a homogeneous area like a skin.

Figure 4:
FIG. 4 shows a video picture in which the false contour effect is simulated.

The artefact due to the false contour effect is shown in FIG. 4. On the arm of the displayed woman are shown two dark lines which, for example, are caused by this false contour effect. Also in the face of the woman such dark lines occur at the right side.

The degradation is enhanced when the image has a smooth gradation and also when the light emission period exceeds several milliseconds. So, in dark scenes the effect is not so disturbing as in scenes with average grey level (for example luminance values from 32 to 223).

In addition, the same problem occurs in static images when observers are shaking their heads which leads to the conclusion that such a failure depends on the human visual perception.

To better understand the basic mechanism of visual perception of moving images, a simple case will be considered. The discussion is made for a transition between the luminance levels 128 and 127 moving at a speed of five pixels per video frame and the eye is following this movement.

Figure 5:
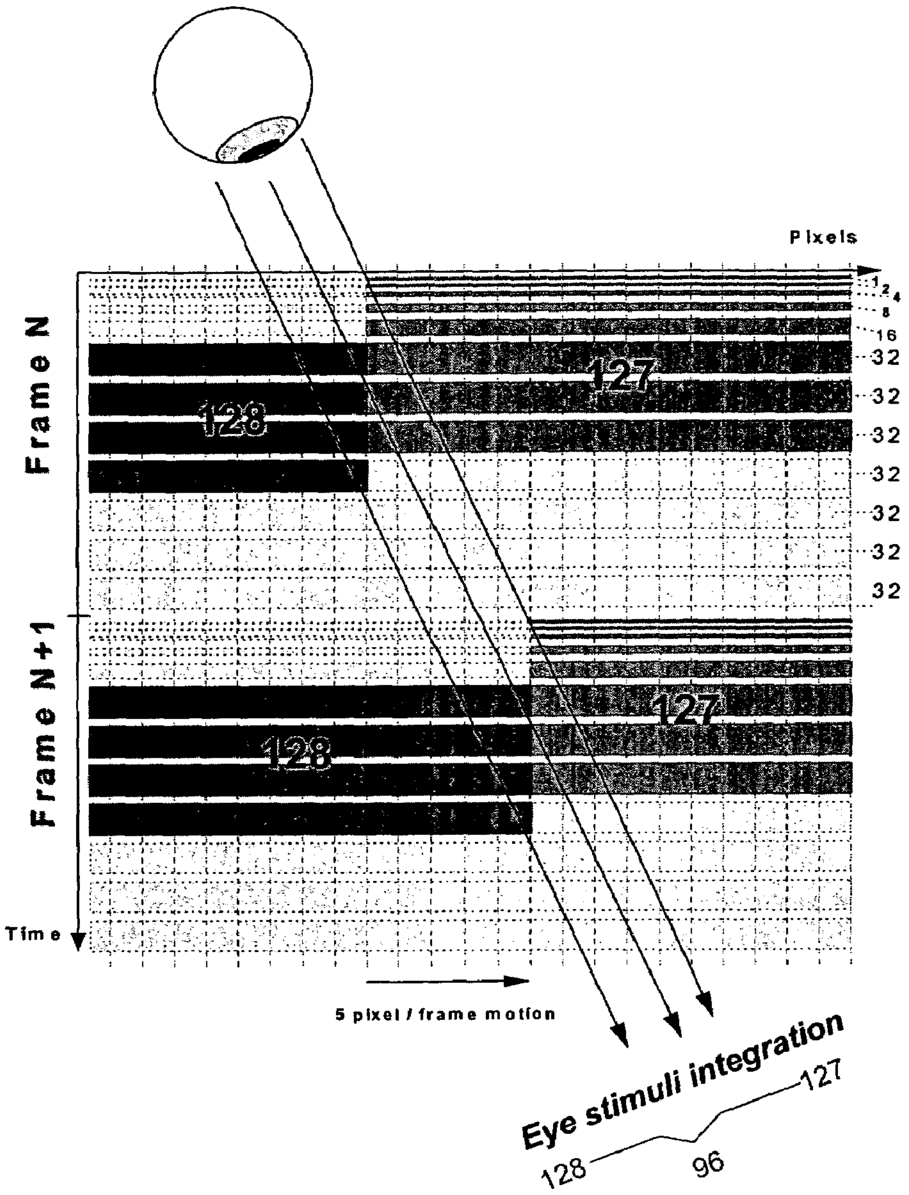
FIG. 5 shows an illustration for explaining the false contour effect.

FIG. 5 shows this situation displaying a frame N and a frame N+1. Also for the frame N the twelve sub-fields weights are depicted at the right side. FIG. 5 only shows a part of one pixel line of the display. In FIG. 5 a darker shaded area is shown corresponding to the luminance area level 128 at the left side and a lighter shaded area corresponding the luminance area level 127 at the right side.

It is here noted that luminance is only exemplarily mentioned. More generally speaking is to say "signal level" which means in particular the signal level of an RGB colour component. As mentioned before, in a colour PDP there are three cells for each pixel. For generating the right colour of a pixel, three sub-field code words are required corresponding to the three cells of a pixel.

In FIG. 5 the sub-field organization of FIG. 3 is used for building the luminance levels 128 and 127. The three parallel lines originating from the eye in FIG. 5 indicate the direction in which the eye is following the movement. The two outer lines show the area borders where a faulty signal will be perceived. Between them the eye will perceive a lack of luminance as depicted in the eye stimuli integration curve at the bottom of FIG. 5. This leads to the appearance of a dark stripe in the corresponding area which is illustrated in the right picture of FIG. 6.

Figure 6:
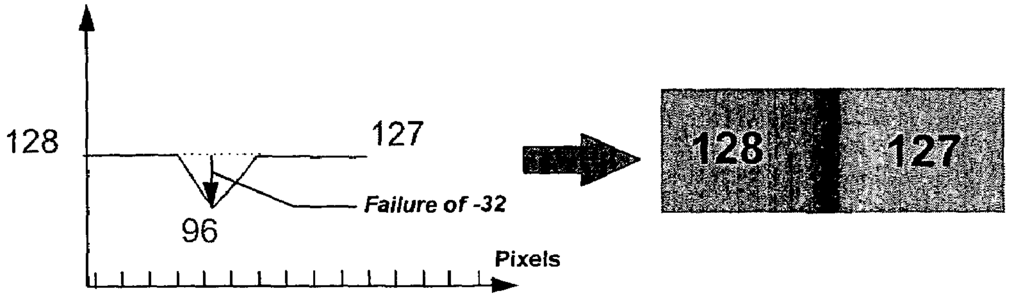
FIG. 6 illustrates the appearance of a dark edge when a display of two frames is being made in the manner shown in FIG. 3.

The effect that a lack of luminance will be perceived in the shown area is due to the fact that the eye will no more integrate all lighting periods of one pixel when the point from which eye receives light is in movement. Only some of the light pulses are integrated when the point moves. Therefore, there is a lack of corresponding luminance and the dark stripe will occur. At the left side of FIG. 6 there is shown an eye-stimuli integration curve which shows the distribution of the luminance level over the pixels. As one can see there is between the levels 128 and 127 a lack of luminance where the luminance level drops to level 96. FIG. 6 shows the reaction of the eye cells during observing the moving picture shown in FIG. 5. The eye cells having a good distance from the horizontal transition will integrate enough light from the corresponding pixels. Only the eye cells which are near the transition will not be able to integrate a lot of light from the same pixels. In case of a gray scale pictures this effect corresponds to the apparition of artificial white or black edges. In the case of colored pictures, since this effect will occur independently on the different color components, it will lead to the apparition of colored edges in homogeneous areas like skin.

Figure 7:
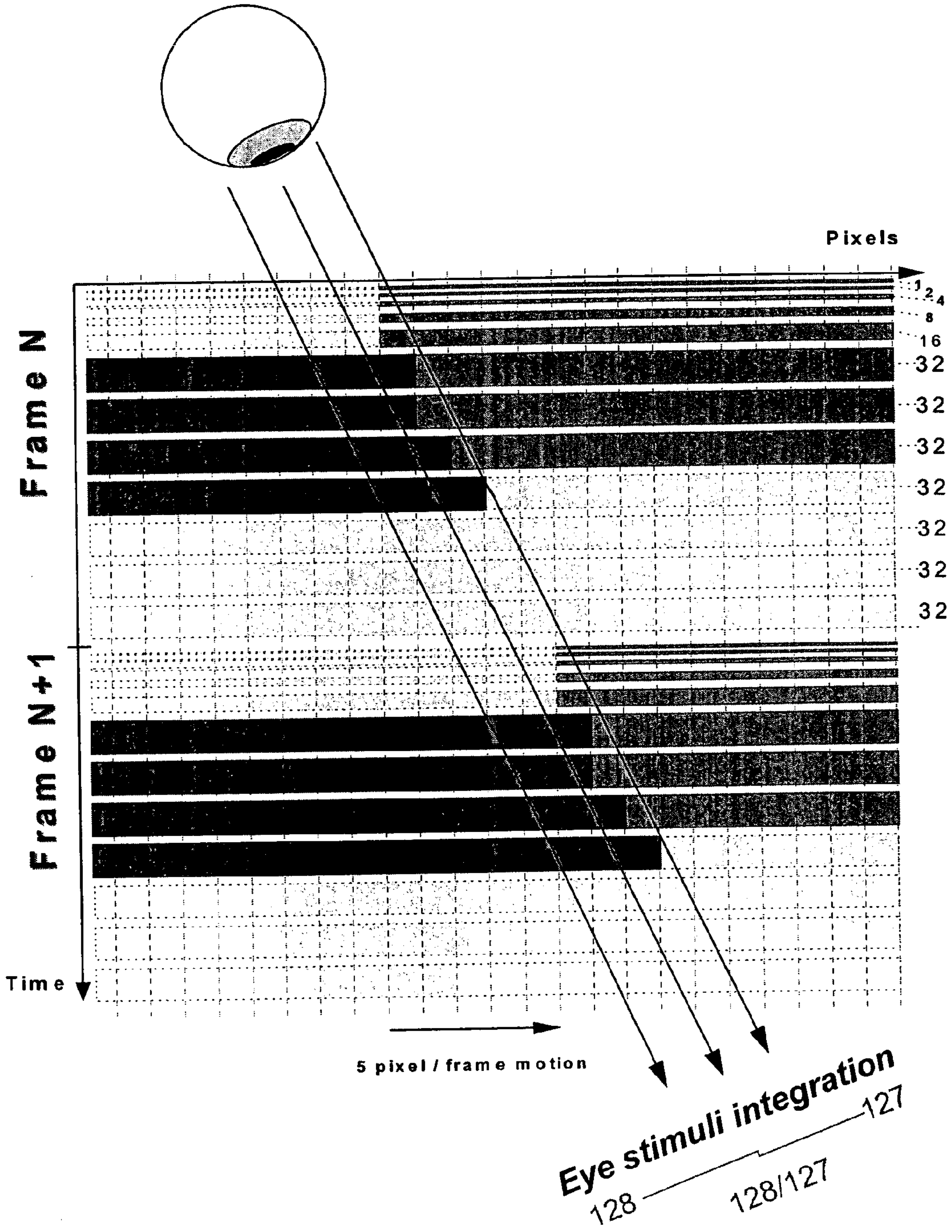
FIG. 7 shows the concept of sub-field displacement for compensating false contour effect.

Now the main idea of an invention disclosed in another European Patent Application of the applicant, see EP-A-0 980 059, is to anticipate the movement in the picture in order to position the different light pulses of a cell of the moving area on the eye integration trajectory. According to this the light pulses of some sub-fields of a pixel in a picture are shifted to another pixel or pixels in the current video frame, depending on the eye movement, to make sure that the eye will receive the right information at the right time during its movement. This principle is illustrated in FIG. 7. There it is shown that the light pulses of the sixth and seventh sub-field of all pixels shown are shifted by one pixel to the right, the light pulses of the eighth sub-field are shifted by two pixels to the right and the light pulses of the ninth sub-field are shifted by three pixels to the right. All pixels have the same motion vector, so that they are all subject of shifting. The sub-field shifting operation can simply be done by shifting the sub-field code word bits. The effect of this is, that the eye following the movement in the picture will integrate all the lighting periods of the sixth to ninth sub-field, thus leading to a corresponding luminance value of 128 as shown in the eye-stimuli curve at the bottom of FIG. 7. The result is that no dark area will be perceived.

It is notified that the illustration is idealized in that respect that the stimuli integration curve is smoothed at the border areas of the transition. Another point to which attention is drawn is the fact, that the motion vector is defined in the conventional manner, i.e. it indicates where a pixel of a current frame is going to in the following video picture.

There appears a problem with this compensation method in the case that an object hides another object and both objects are moving relatively to each other. In such a case a new area will appear between the two moving objects. This phenomenon occurs in case of object crossing. The problem is enhanced, if the objects are moving in opposite direction. Obviously, the border between these two objects has to be compensated to provide a good sharpness. As explained above, the false contour effect will drastically reduce the sharpness. Nevertheless, if we have to compensate an area at the frontier of another object which is currently hidden, there will occur a blurred area with an extension depending on the motion vectors of the two moving objects.

Figure 8:
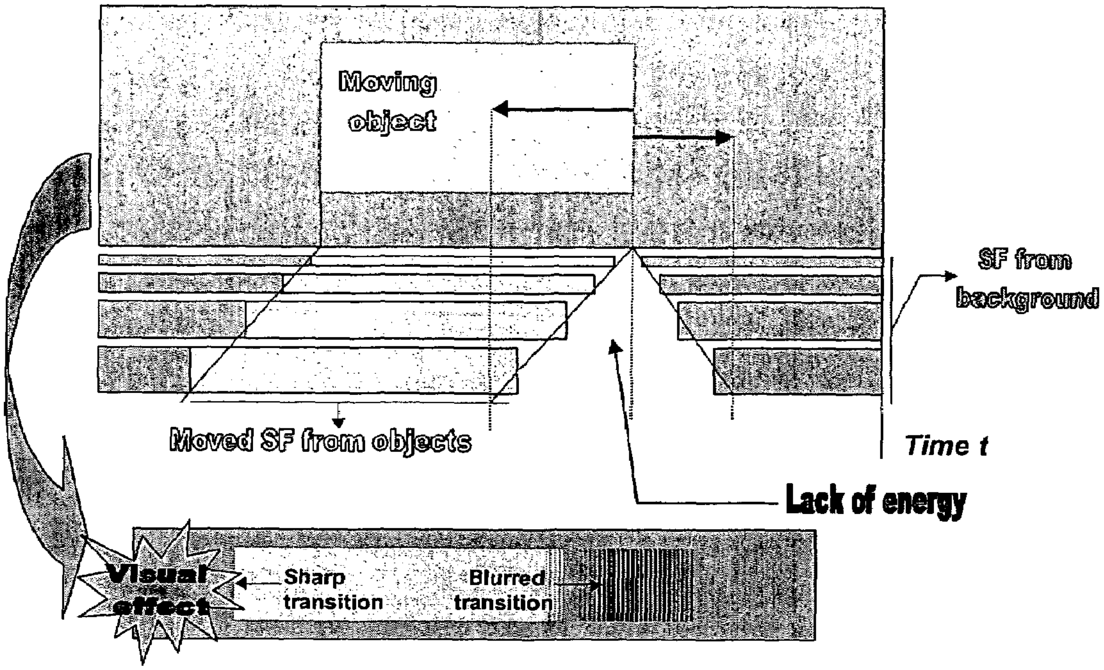
FIG. 8 shows an illustration for a sub-field shift operation producing a lack of energy at the border of two oppositely moving objects.

This is illustrated in FIG. 8. FIG. 8 shows an example of a moving object which is shown as a rectangular area in light gray moving horizontally to the left side with the motion vector $\vec{V}_F$. The moving object, is moving on a background, shown in dark gray, which is moving itself to the right side with a motion vector $\vec{V}_B$. The motion vectors show the direction and distance the front object and the background object is moving during one frame.

If there is used the compensation method of subfield-shifting explained above then we get a shifting of the light pulses of the moving object to the left side and a shifting of the light pulses for the background pixels to the right side. This is depicted in the middle of FIG. 8, where a few sub-field periods are shown. This leads to the appearance of an area in the picture where a lack of light/energy is perceived. This is because the eye will not integrate enough light pulses in this area. The appearing area is between the shifted light pulses for the pixels of front and background object. The area is getting broader from sub-field to sub-field due to the fact that the shifting increases with the sub-field number.

At the bottom of FIG. 8 it is illustrated what the eye of a viewer will observe. At the left border of the moving front object a sharp transition will appear. At the right border of the moving object a blurred transition will occur. This is sometimes referred to the appearance of a "black hole".

Figure 9:
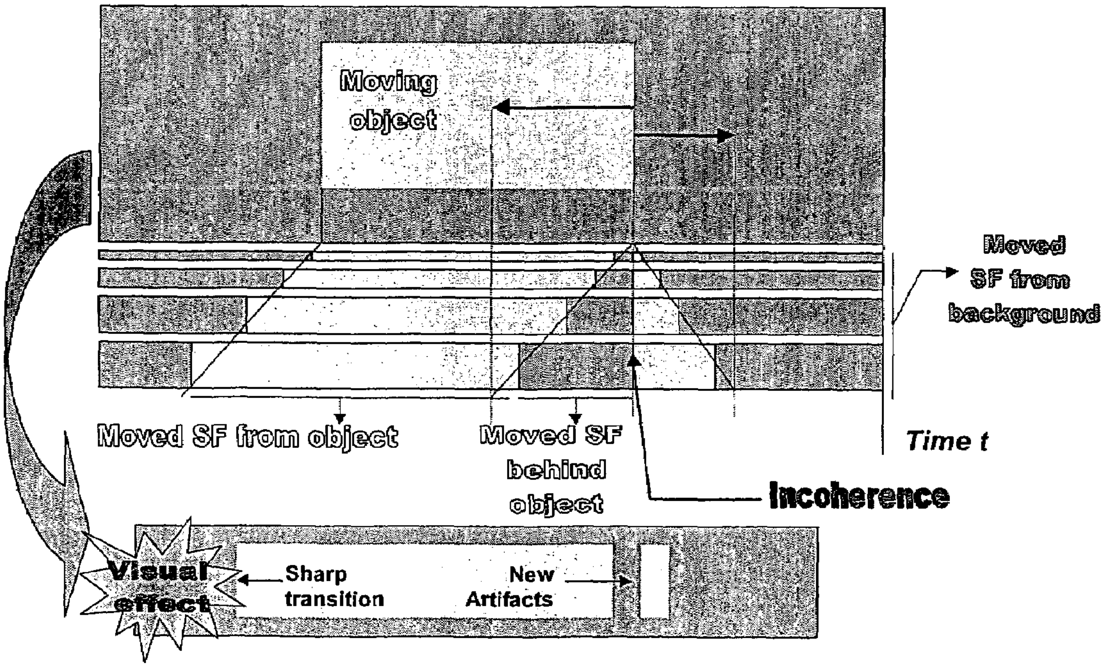
FIG. 9 shows an illustration for a sub-field dragging operation with a dragging of movement information instead of shifting as previously shown in FIG. 8.

FIG. 9 shows the same situation where a front object moves to the left side and a background object moves to the right side. The movements of front and background object are indicated with arrows. In this case the motion vectors are calculated differently and they are utilised in a different manner. This sort of motion vector calculation and treating is disclosed in another European Patent Application of the applicant with the application number 00250230.0. It is therefore expressively referred to this application for the disclosure of this embodiment.

According to the solution in this further application the compensation of the false contour effect is made by using motion vectors for the pixels in the video picture calculated in a motion estimator in a manner that the resulting motion vector determines for a current pixel from which location in a previous video picture the current pixel comes from. So, for each pixel or block of pixels in the current frame, a unique motion vector defines the source of this pixel in the previous frame. In addition, the vector is used in a different way. In other words, for each pixel from the current frame, the vector describes where the pixel is coming from in the previous frame. It is assured in the motion estimator itself, that only one vector is assigned to a pixel, even if there are several possibilities for one pixel. E.g. in the case that several pixels of a previous video picture move to the same location in the current picture, the possible vectors can be combined to one final motion vector. The sub-fields are not shifted away from a current pixel as in the previous embodiment, but they are dragged to a current pixel from neighboring pixels along a motion vector. This dragging produces a different artifact in case of object crossing and this is illustrated in FIG. 9. As the information for compensating false contour effect is taken from the pixels located behind the moving pixel, this will lead to a doubling of the transition border as shown in the bottom of FIG. 9. The information dragged to the pixels of the moving background is coming from the light gray front object. Likewise the information dragged to the pixels of the moving front object is coming from the dark gray background object.

Also in this case we see new artifacts coming from the sub-field dragging in the case of objects crossing. In fact, the failure appears again in the appearing area since it corresponds to a new area that is currently hidden in the picture. A part of the background is hidden behind the grey coloured square which is the moving object.

Figure 10:
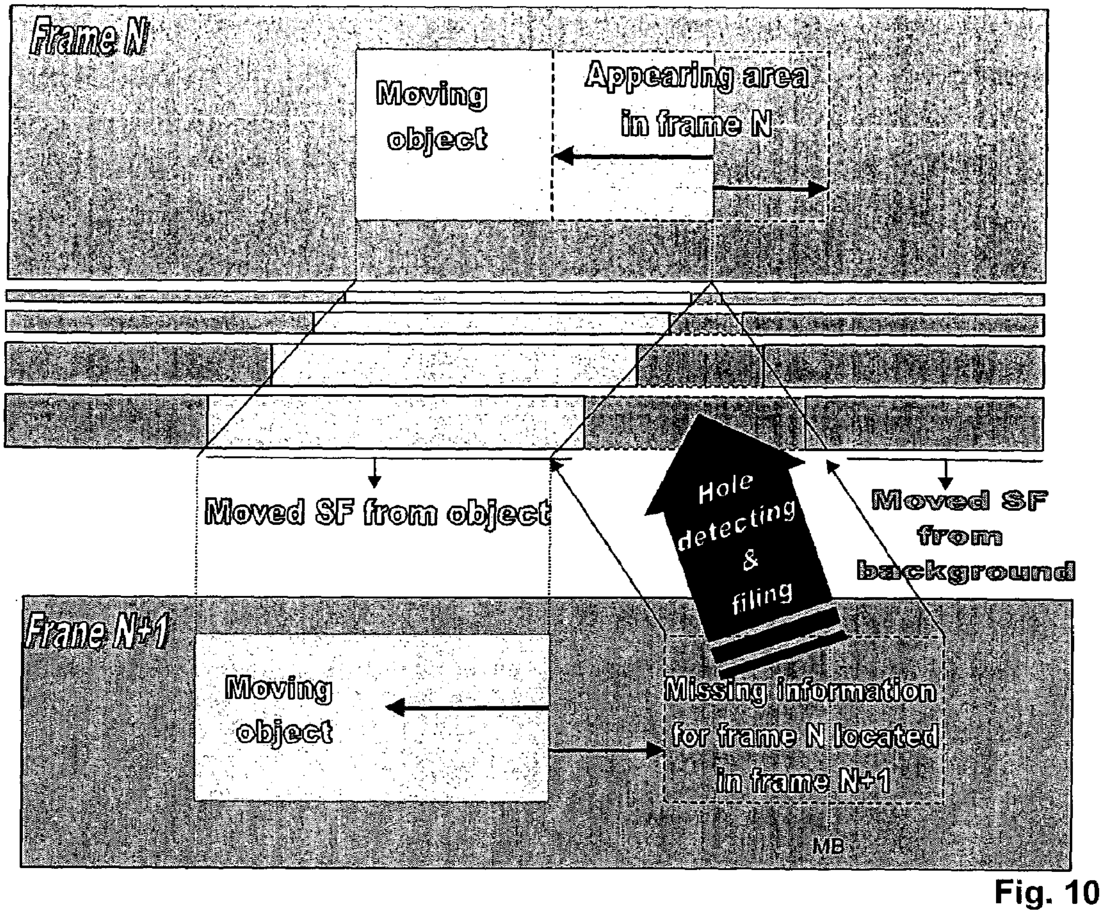
FIG. 10 shows an illustration of a false contour compensation according to the invention.

For improving both compensating methods based on sub-field shifting and based on sub-field dragging, it has been invented a new 3D-processing which basically consists in the detection of an "appearing area" followed by a "hole filling" with information coming from the next frame. First, the improved compensation method for the sub-field shifting is explained in detail. This is illustrated in FIG. 10. This figure shows the frame N and the next frame N+1. The hidden area of frame N, which will appear in the next frame N+1 is bordered with a dashed line in frame N. This area is the appearing area. From frame N+1 it is evident, that the appearing area fully consits of pixels from the background object. It is indicated in FIG. 10, that the appearing area has been moved also to the right from frame N to frame N+1. This should be taken into account for locating the appearing area in frame N+1. For an exact "hole filling" in frame N, it is necessary to use the information of the moved appearing area in frame N+1. Thus, it is required to use the motion vector information from frame N to locate the pixels in frame N+1 for the hole filling. It is evident from FIG. 10 that for the lower sub-field numbers only the sub-field entries of a few pixels need to be taken from frame N+1 while for the higher sub-fields the sub-field entries of a greater number of pixels need to be copied. The information for which sub-field which pixels need to be compensated is available from the sub-field shifting calculation. For the disclosure of the details of sub-field shifting calculation it is expressively referred to the document EP 0 978 817 A1 again. The information from which pixels in the moved appearing area of frame N+1 the sub-field entries need to be taken for the hole filling, is likewise available from the calculated sub-field shifts. The moved border between front object and background object is shown in FIG. 10 by a vertical line MB. The sub-field shifts for each sub-field determine which pixels to the left and to the right of this vertical line MB need to be taken for the hole filling. With such an improved compensation method, also the right border of the moving object will be completely respected and this leads to an enhancement of the global picture sharpness.

With regard to the second compensation method based on sub-field dragging, the follwing modification is a solution for compensating the artifact shown in FIG. 9. The dragged information cannot be taken from the current frame but instead it needs to be taken from the next frame. In this case, behind a current pixel the right information will be available as can be seen in FIG. 10. The corresponding pixel in frame $F_{N+1}$ to the current pixel of the background object at the border in frame $F_N$ is lying in the middle of the background object region and thus it is assured that the right information will be dragged to the pixels at the border of the two moving objects.

Figure 11:
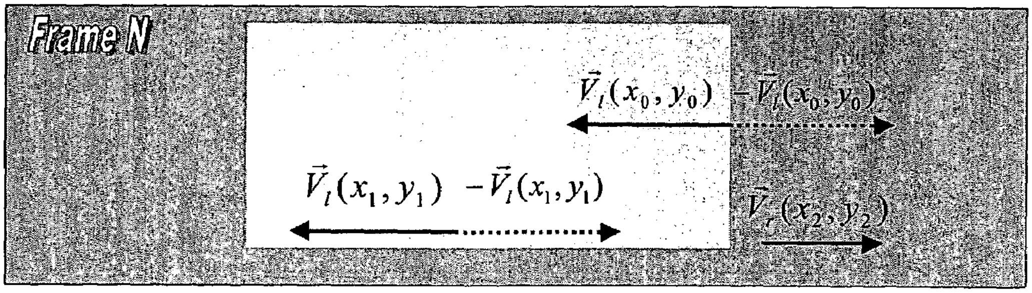
FIG. 11 shows an illustration of an appearing area detection using motion vectors of two successive frames.

For the improved compensation method something like an "appearing area" detector is required. There a various possibilities to detect appearing areas. In the following there is proposed a simple method to perform the detection of an appearing area. Let us assume, we dispose of a first motion vector $\vec{V}_l(x,y)$ which corresponds to the movement of the light gray rectangular of FIG. 10, and a second motion vector $\vec{V}_r(x,y)$ which corresponds to the movement of the background. In order to detect an appearing area it will be checked whether the motion vectors located behind a given motion vector still indicate a similar movement. In order to do that the trajectory defined by the opposite of the first and the second vector will be analysed as presented in FIG. 11. On FIG. 11 the trajectory defined by the opposite of the first vector $\vec{V}_l(x_1,y_1)$ is still in the square and the vectors located at those locations are similar: Therefore the corresponding region is not a critical area. In the case of the position $(x_0, y_0)$ at the border of the two moving objects the vectors located on the trajectory defined by $-\vec{V}_l(x_0,y_0)$ are outside of the rectangular and they have the opposite direction. The same is true e.g. for the vector $\vec{V}_r(x_2,y_2)$. All vector positions having vectors behind them with an opposite direction, belong to an appearing area. With this simple strategy, the points of the appearing area will be easily found. The disclosed appearing area detector can be used for both improved compensation methods, the one with sub-field shifting the one with sub-field dragging.

Figure 12:
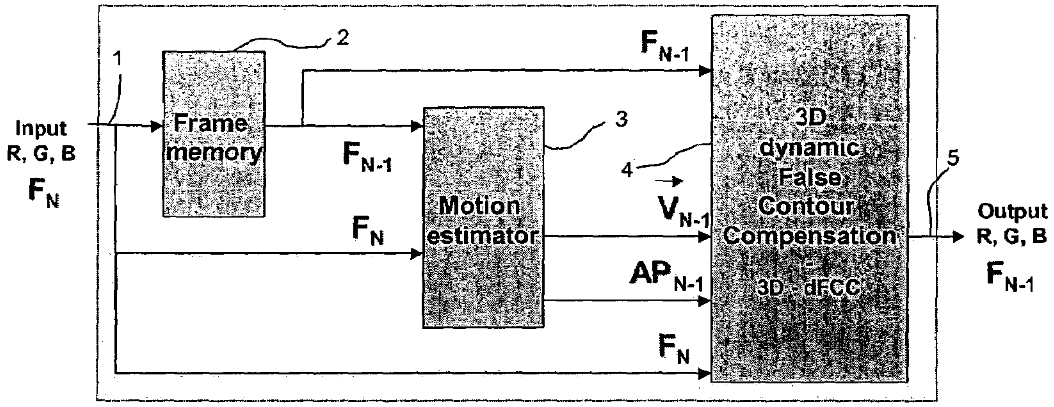
FIG. 12 shows a first embodiment of the inventive apparatus in form of a block diagram.

FIG. 12 shows a first embodiment of an apparatus according to the invention. In this first embodiment there is an input 1 to a frame memory 2, a motion estimator 3 and a compensating unit 4. The frame memory 2 is connected to the motion estimator 3 and the compensating unit 4. The motion estimator 3 has a first and second output which are connected to the compensating unit 4. At the input 1 RGB data of a frame $F_N$ is received and forwarded to the frame memory 2, the motion estimator 3 and the compensation unit 4. To the motion estimator 3, beside the frame $F_N$ the previous frame $F_{N-1}$ is also delivered from frame memory 2. Please note, that the previous frame $F_{N-1}$ will be regarded as the current frame hereinafter. With these two frames the motion estimator 3 computes the motion vectors $\vec{V}_N$ for frame $F_N$. The motion vectors $\vec{V}_{N-1}$ are forwarded to the compensation unit 4. The motion vectors $\vec{V}_{N-1}$ for the previous frame $F_{N-1}$ are stored in motion estimator 2 for this purpose. Also the motion estimator 3 outputs in this embodiment an information $AP_{N-1}$ which indicates for each pixel whether it belongs to an appearing area in the frame $F_{N-1}$ or not. One bit for each pixel is sufficient for this information $AP_{N-1}$. The pixels of an appearing area need to be compensated with the improved compensation method as explained above. The frame $F_{N-1}$ is also input to the compensation unit 4 for this purpose. In the compensation unit 4 a compensation is made for frame $F_{N-1}$. The compensated frame $F_{N-1}$ appears at output 5 of this block . The compensation system as shown in FIG. 12 introduces a process delay of one frame.

Figure 13:
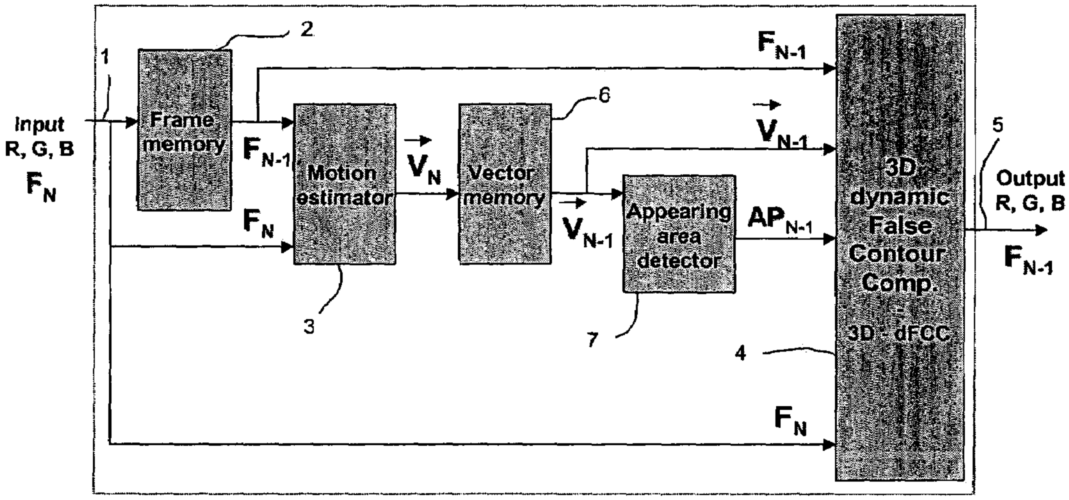
FIG. 13 shows a second embodiment of the inventive apparatus.

An alternative concept is to combine a standard motion estimator with a distinct appearing area detector. E.g. the appearing area detector disclosed above can be used. This alternative concept is shown in FIG. 13. Partially, in FIG. 13 the same reference numbers are used as in FIG. 12. These reference numbers denote the same components as in FIG. 12.

The embodiment of FIG. 13 is different to the embodiment of FIG. 12 in comprising a separate vector memory 6 and a separate appearing area detector 7. The motion estimator 3 is simplified and is a standard motion estimator which delivers the motion vectors for the pixels of the frame $F_N$. The function of the vector memory 6 is to store motion vector data which is coming from the motion estimator 3 during one frame period, so that the appearing area detector 7 gets the motion vectors $\vec{V}_{N-1}$ of the previous frame $F_{N-1}$. The appearing area detector 7 determines for each pixel of frame $F_{N-1}$, whether it belongs to an appearing area and gives the appearing area signal $AP_{N-1}$ to the compensating unit 4. The way of deciding whether a pixel belongs to an appearing area or not has been explained above.

At the output of the compensation unit 4 the compensated sub-field code words for the three colour components RGB occur. These sub-field code words are used for driving the display in the known manner.

The method and apparatus according to the invention is not only applicable for false contour effect compensation. E.g. in case of use of a new plasma display technology, in which the false contour effect is no longer an issue, the disclosed method and apparatus can be used for picture quality improvement, in particular sharpness improvement.

The invention claimed is:

1. Method for processing video pictures, e.g., the video pictures consisting of pixels, the pixels being digitally coded with at least one digital code words, wherein to each bit of a digital code word a certain duration is assigned, hereinafter called sub-field, during which the whole pixel or a component of the pixel is activated, wherein a motion vector is calculated for a pixel, and the motion vector is used for updating the at least one sub-field code word of the pixel for picture quality improvement, the method comprising the steps of: checking in the current picture whether there is an area which is currently hidden but appears in a next video picture; and updating the sub-field code words of pixels from the appearing area in the current picture by utilizing sub-field code word entries of pixels from the appeared area in a next video picture.

2. Method according to claim 1, wherein the updating of the sub-field code words based on the motion vector is done by calculating shift coordinates for sub-field code word entries in dependence of the motion vector, wherein the motion vector is defined to point to the place, where a pixel in a current video picture moves to in a next video picture, and the shift coordinates are used for shifting sub-field code word entries of a current pixel to pixels along the motion vector direction.

3. Method according to claim 2, further comprising a step of updating the sub-field code words of the pixels from the appearing area in the current picture by taking over sub-field code word entries of corresponding pixels from the appeared area in a next video picture.

4. Method according to claim 1, wherein the updating of the sub-field code words for the pixels of the current video picture based on their motion vectors is done by calculating drag coordinates for sub-field code word entries in dependence of the motion vector, wherein the motion vector is defined to point to the place, where a pixel in a current video picture is coming from in a previous video picture, and the drag coordinates are used for dragging sub-field code word entries of pixels in the current video picture along the motion vector direction to the current pixel.

5. Method according to claim 4, further comprising a step of compensating the sub-field code words of the pixels from the appearing area in the current picture by dragging sub-field code word entries of corresponding pixels in a next video picture along the motion vector direction to the current pixel.

6. Method according to claim 1, further comprising analyzing whether, for pixels located en the mirror transformed motion vector arrow of the current pixel, motion vectors are assigned, which do not have a similarity with the motion vector of the current pixel for checking whether a current pixel belongs to an area which is currently hidden but appears in a next video picture.

7. Apparatus for processing video pictures, the video pictures consisting of pixels the pixels being digitally coded with at least one digital cede word, wherein to each bit of a digital cede word a certain duration is assigned, hereinafter called sub-field, during which the whole pixel or a component of the pixel is activated, wherein the apparatus comprises a motion estimation unit in which a motion vector is calculated for a pixel, wherein the apparatus further comprises a processing unit in which the motion vector is used for updating the at least one sub-field code word of the pixel for picture quality improvement, wherein the apparatus further comprises an appearing area detector which is adapted to check in the current picture whether there is an area which is currently hidden but appears in a next video picture, and wherein the apparatus comprises a compensating unit in which the sub-field code words of pixels from the appearing area in the current picture are compensated by utilizing sub-field code word entries of pixels from the appeared area in a next video picture.

8. Apparatus according to claim 7, wherein the appearing area detector is integrated in the motion estimator.

9. Apparatus according to claim 7, wherein the appearing area detector is a separate unit, which receives as an input the motion vectors of a current video picture.

10. Apparatus according to claim 7, the apparatus comprising a matrix display, such as plasma display, LCOS display or DMD display.

* * * * *